United States Patent [19]

Baker et al.

[11] Patent Number: 4,486,128
[45] Date of Patent: Dec. 4, 1984

[54] STRUCTURAL COMPONENT DRILLING MACHINE HAVING PROGRAMMABLE DRILLING LOCATION INDEXING

[75] Inventors: Irwin G. Baker, Bellevue; Robert L. Fuller, Jr., Issaquah; Dwayne E. Proff, Puyallup, all of Wash.

[73] Assignee: The Boeing Company, Seattle, Wash.

[21] Appl. No.: 331,078

[22] Filed: Dec. 15, 1981

[51] Int. Cl.³ .................... B23B 41/00; B23B 49/00
[52] U.S. Cl. ............................. 408/3; 408/37; 408/13; 408/16; 408/41; 408/88; 408/97
[58] Field of Search .............. 408/3, 12, 13, 16, 37, 408/41, 88, 96, 97; 409/185, 186, 188, 187; 144/92, 93, 365

[56] References Cited

U.S. PATENT DOCUMENTS

| | | | |
|---|---|---|---|
| 2,300,253 | 10/1942 | Hamilton et al. | 408/41 |
| 2,838,963 | 6/1958 | Good et al. | 408/13 |
| 2,897,693 | 8/1959 | Menz | 408/12 |
| 3,040,603 | 6/1962 | Benton | 408/3 |
| 3,124,977 | 3/1964 | Obear | 408/3 |

Primary Examiner—Z. R. Bilinsky
Assistant Examiner—Thomas Kline
Attorney, Agent, or Firm—Christensen, O'Connor, Johnson & Kindness

[57] ABSTRACT

A workpiece drilling machine includesto be moved to any of several drilling locations along the workpiece. A plurality of indexing detents is formed along the rail coinciding with each drilling location. A cam follower on the drill carriage is engageable with the detents to coarsely position the drill carriage. An index-cancelling device is associated with each detent and controllable by a preprogrammed input device to determine which of the detents is to be available for engagement by the cam follower. The programmed input device has a visual marking thereon corresponding to the information encoded therein and a visually perceptible status readout is controlled by the index-cancelling means to permit visual verification that the index-cancelling devices are arranged in accordance with the desired pattern. An accurately positioned bearing is located at each drilling location and is engaged by a fine-positioning pin mounted on the drill carriage prior to the start of drilling to provide fine positioning of the drill carriage. A workpiece locator device is included that allows the workpiece to be positioned in one of several discrete positions relative to the rail. A clamping system located in the drill carriage clamps the workpiece in position referenced to the drill carriage to eliminate the effects of warp and twist in the workpiece on hole location.

12 Claims, 14 Drawing Figures

STRUCTURAL COMPONENT DRILLING MACHINE HAVING PROGRAMMABLE DRILLING LOCATION INDEXING

BACKGROUND OF THE INVENTION

This invention relates to drilling devices for drilling holes in structural components, for example, those used in aircraft construction, and more particularly relates to a machine for drilling structural components at preprogrammed locations along the structural component.

The construction of an aircraft requires the assembly of a large number of structural components. Among those components are included the stringers which are elongate components attached to the metal sheeting that becomes the outer skin of the aircraft. To facilitate the mass production of aircraft it is desirable to prepare the stringers for attachment to the skin panels prior to the assembly of the skin panels to the aircraft frame members. A necessary operation in the construction is to attach clips to the stringers typically by means of rivets passing through holes drilled in the stringers and the clips. The clips form the interface between the stringer and the frame with the skin panels being riveted to the stringers. To facilitate construction it is desirable to pre-drill the holes in both the stringers and the clips prior to their attachment to one another and certainly prior to the time of final assembly of the skin to the frame. In order for pre-drilling to be effective, it is necessary both to accurately locate the holes in the stringers and to drill the holes perpendicular to the stringer surfaces so that the clips will be correctly aligned with their associated frame locations upon final assembly of the skin to the stringer.

A manual drilling fixture has been used to hold the stringer prior to its assembly to allow operators to drill by hand each of the four holes required for each clip location on the stringer. The manual drilling fixture requires that the operator manually clamp the stringer to the fixture and walk down both sides of the fixture placing a hand-held drill bushing in an appropriate locating bushing installed at each drilling location. Then, using the other hand, the operator inserts the drill bit through the drill bushing to drill the hole in the stringer. In order to ensure correct location of the holes in the stringer, the operator is required to exercise extreme care to assure proper stringer positioning in the fixture and also to exercise extreme care in determining which of the several possible combinations of clip location is to be drilled in any particular stringer. Also, due to the manual operation of the drill, wear in the drill bushings is severe and tends to cause hole elongation and thereby some stringer clip mislocation and misalignment. Corrections to the drilling must be made during final assembly when it is extremely awkward to reach certain locations where the clip must be attached to the stringer, thus, severely affecting the efficiency of construction.

It is therefore an object of the present invention to provide a machine for drilling stringers which allows precise indexing of the hole locations prior to final assembly of the stringer to the aircraft skin.

It is another object of this invention to provide such a machine in which the drilling location indexing is automatically programmed.

It is a further object of this invention to provide a stringer-drilling machine which allows accurate locating of the holes drilled in the stringer without regard to warp and bend of the stringer.

It is a further object of this invention to provide a stringer-drilling machine which provides feedback to the operator prior to the start of the drilling operation, informing the operator that correct indexing of the drilling location has occurred.

SUMMARY OF THE INVENTION

A stringer-drilling machine includes a stationary tool base having stringer support posts located at positions corresponding to desired hole locations. A drill carriage having means for mounting drill bits thereon is movably mounted on a rail assembly that extends along the entire length of the tool base so that the drill carriage can be moved along the rail to each of the several drilling locations. A plurality of indexing detents is formed along the rail coinciding with each of the drilling locations. The drill carriage includes a cam follower means capable of cooperative engagement with the indexing detents to provide a coarse positioning of the carriage at the drilling location. Each of the detents has associated with it an index-cancelling means selectively operable to prevent the cam follower means from engaging a selected detent. A control means is provided for selectively operating each of the index-cancelling means in accordance with information encoded on programmable selection means. The programmable selection means has visually perceptible markings thereon which permit an operator to visually observe the information programmed on the selection means. A readout means is provided which provides a visually perceptible indication of the status of each of the index-cancelling means thereby permitting the operator to observe whether or not the configuration of the index-cancelling means is in accordance with the pattern encoded on the programmable selection means prior to starting the drilling operation. A workpiece locator is provided for indexing the workpiece with reference to the rail assembly prior to beginning the drilling operation.

Preferably, the control means includes a series of magnetic sensors arranged in a predetermined pattern and the programmable selection means includes a card formed of laminated ferrous and nonferrous materials with the information programmed on the card by removal of the ferrous material at selected locations. The card is placed in proximity to the pattern of magnetic sensors in the control means which in turn operate the index-cancelling means in accordance with the programmed sequence.

Preferably, the drilling machine also includes a clamping and locating means associated with the drill carriage that clamps the stringer in the proper location for drilling to provide accurate vertical positioning of the holes in the stringer referenced to the carriage rather than to the tool base to compensate for warp or bend in the stringer being drilled.

BRIEF DESCRIPTION OF THE DRAWINGS

The principles of the present invention will be better understood by those of ordinary skill in the art and others upon reading the ensuing specification taken in conjunction with the appended drawings wherein.

DETAILED DESCRIPTION OF PREFERRED EMBODIMENT

Figure 1:
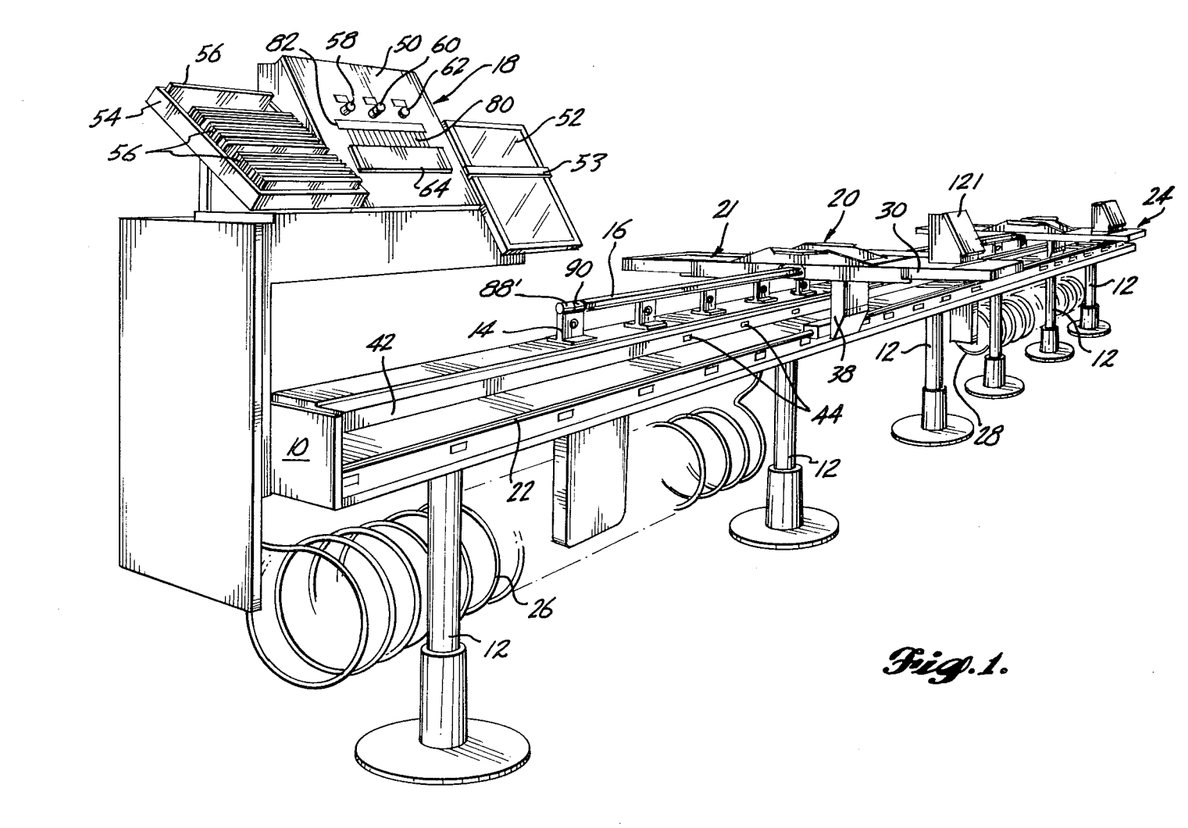
FIG. 1 is an isometric view of a structural component drilling machine made in accordance with the principles of the present invention.

FIG. 1 is an isometric view of one embodiment of a device for drilling aircraft stringers made in accordance with the principles of the present invention. A tool base 10 is mounted on a series of support pillars 12. A series of drill blocks 14 is mounted on the tool base 10, the drill blocks being mounted at locations corresponding to the desired locations of holes to be drilled in a stringer 16 resting on the drill blocks. A control station 18 is located at a first end of the tool base and includes the housing for the control circuitry associated with the stringer drilling machine. The drill motors themselves are mounted on a first drill carriage 20 mounted for movement along elongate rods 22 and 23 running the length of the tool base. A second drill carriage 24 is provided in the preferred embodiment. The second drill carriage 24 has circuitry and controls identical to those of the first drill carriage 20 and operates in an identical manner. The only reason for providing a second carriage is to provide the opportunity to have a second drilling pattern available without the need to physically adjust or relocate the drills mounted in the first carriage. The operation of the second drill carriage is identical to the operation of the first drill carriage and the only difference is in the positioning of the drills within the second carriage. Therefore, the operative description of the invention will be made with reference to the first drill carriage 20 only. If two drill carriages are to be provided it is necessary to provide that the tool base 10 and rods 22 and 23 are of sufficient length to permit one of the carriages to be placed in an inoperative position at an end of the tool base spaced from the end of the stringer 16 while the other drill carriage is being utilized.

Preferably, the electrical connections between the control station and the carriages are accomplished through a series of bus bars located on the tool base 10 which are contacted by wiper-type contacts located in the drill carriage much in the manner of an electric trolley. The use of such an electrical bus bar system eliminates the need for long runs of cabling which tend to become tangled as the carriage moves along the length of the stringer. In the preferred embodiment illustrated, many of the functions, for example the operation of the drill motors, are pneumatically powered; therefore, high-pressure air is provided by means of the helically coiled flexible hoses 26, 28 shown at the bottom of FIG. 1 running to the respective drill carriages from a supply (not shown).

Figure 2:
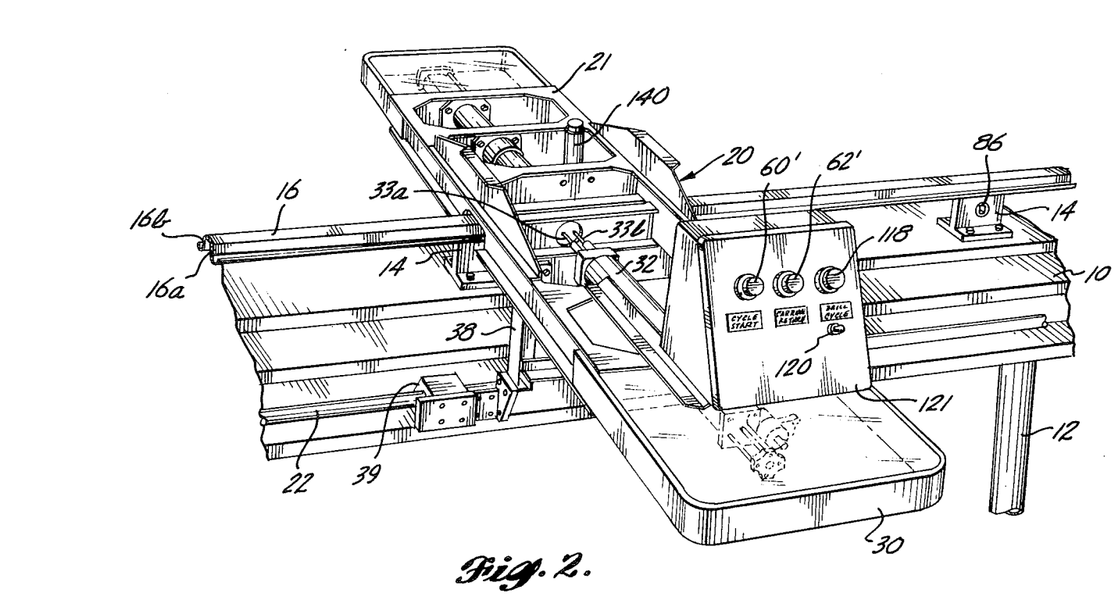
FIG. 2 is an isometric view of a drill carriage utilized with the drilling machine of FIG. 1.
Figure 3:
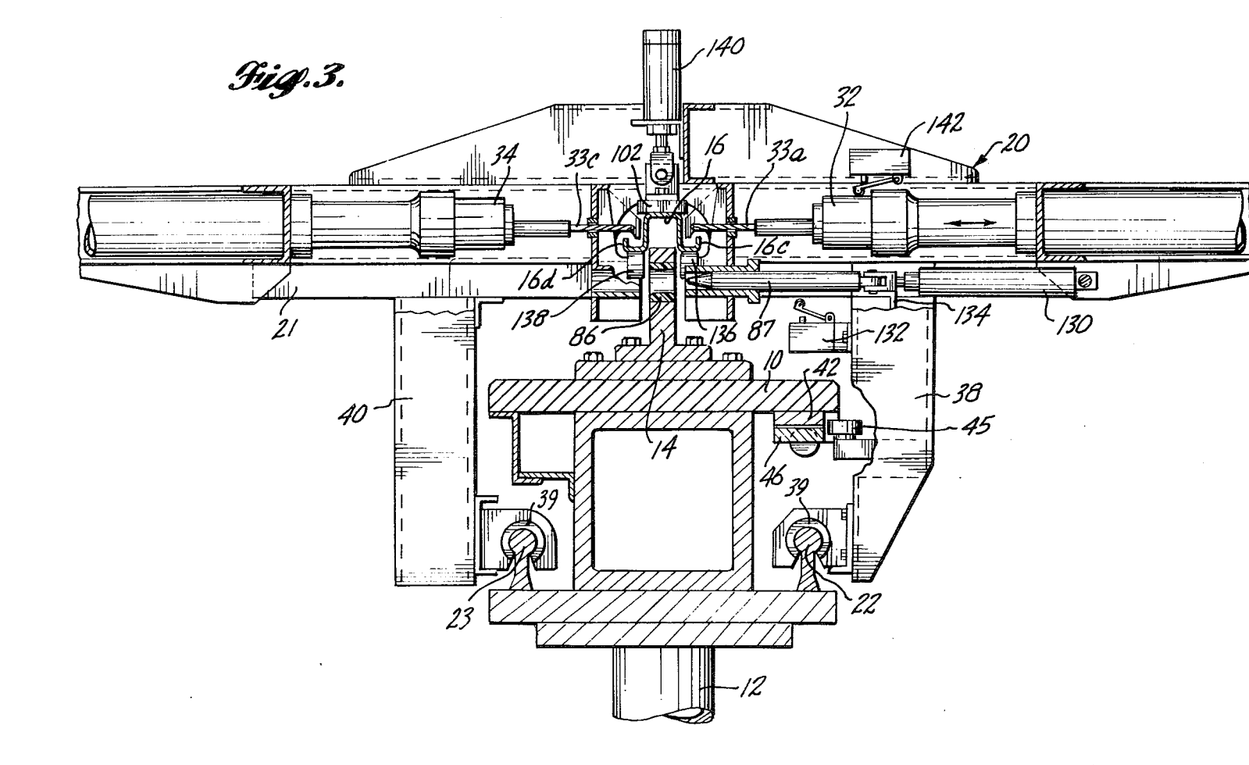
FIG. 3 is a side view in partial cross section of the drilling machine of FIG. 1 with the drill carriage.

Referring now to FIGS. 2 and 3, the drill carriage 20 includes a horizontal frame 21 which overlies the stringer 16 and includes a pair of twin spindle drill motors 32 and 34 mounted on opposite sides of the stringer 16. The drill motors 32 and 34 are mounted on the drill carriage 20 such that the drills 33a, 33b, 33c and 33d mounted in the drill motors can be moved toward and away from the stringer in a direction perpendicular to the stringer to drill holes in opposing stringer sidewalls 16a and 16b. The drill carriage 20 includes downwardly depending first and second mounting brackets 38 and 40 arranged on opposite sides of the tool base 10. Each of the mounting brackets 38 and 40 includes a bearing assembly 39 that rides on rods 22 and 23 respectively.

The carriage 20 has a control panel 121 mounted thereon that permits control of the drilling function directly at the drill carriage. Detailed explanation of the drilling function and its control will be provided below. A bar 30 wraps around an end of the horizontal frame 21 and serves to protect the components of the carriage as well as providing a handle to grasp while moving the drill carriage.

Figure 4:
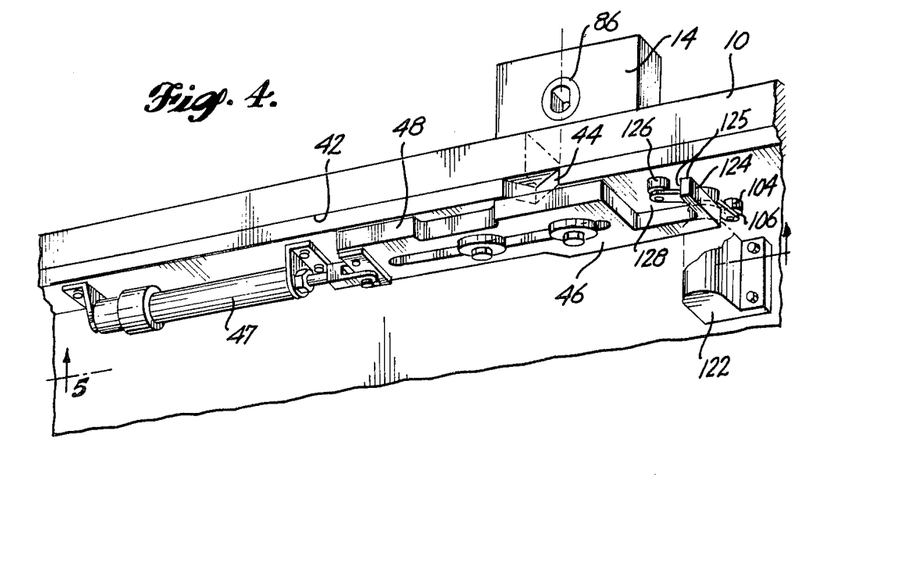
FIG. 4 is an isometric view of the drilling location indexing assembly of the present invention.
Figure 5:
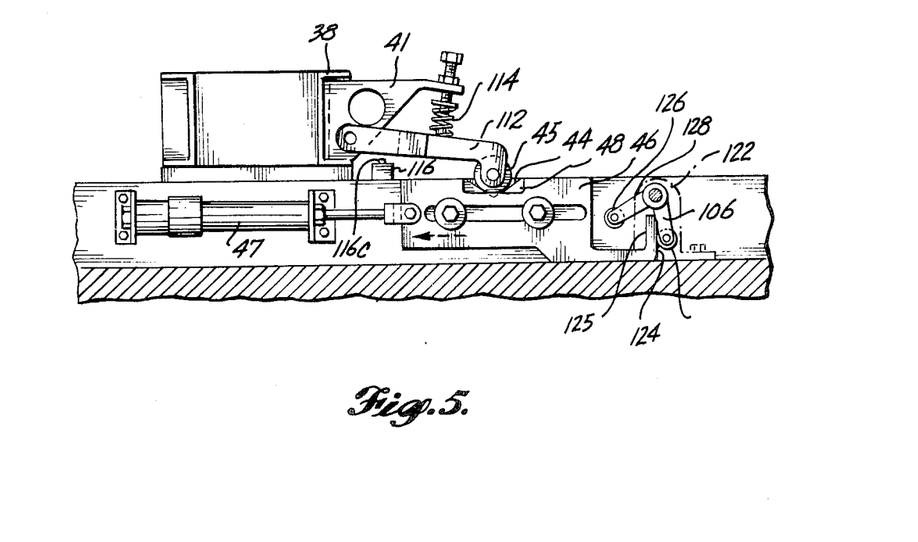
FIG. 5 is a plan view of the drilling location indexing assembly shown in FIG. 4.

Referring now to FIGS. 4 and 5, the tool base 10 has elongate rail 42 affixed to it in parallel relation. The rail 42 includes a series of notches or detents 44 formed therein coinciding with the locations of the drill blocks 14. The drill carriage 20 includes a detent-engaging cam follower which engages the detents as the drill carriage 20 is moved along the rail. The engagement of the cam follower with the detent provides a coarse positioning of the drill carriage at the selected drilling locations. Each of the detents 44 in the rail 42 has an associated detent slide 46 associated with it. The detent slide 46 has a notch 48 formed therein and in the rest or inoperative position of the drilling machine, the detent slide 46 is positioned with the notch 48 in the detent slide 46 out of alignment with the detent 44 as shown in FIG. 4. With the detent slide 46 in the nonaligned position, the cam follower cannot engage the detent 44 and therefore the drill carriage 20 will not lock into a drilling position. During operation of the drilling machine, selected ones of the detent slides 46 are moved by linear actuators 47 so as to align the notch 48 with the detent 44 as shown in FIG. 5, thereby permitting engagement of the cam follower 45 with that particular detent. Selection of the locations to be drilled, and in accordance therewith the control of the movement of the desired detent slides 46, occurs at the control station 18 and will be described below.

The cam follower 45 is rotatably mounted on an arm 112 that in turn is pivotally attached to a follower arm bracket 41 that extends horizontally from the mounting bracket 38. The arm 112 is biased by spring 114 to force the cam follower toward the rail 42. A limit switch 116 is associated with arm 112 such that when the cam follower 45 drops into the detent 44 the switch 116 closes and permits the drilling sequence to be initiated. As pictured in FIG. 5, when the cam follower 45 engages the detent 44 the arm 112 impinges upon a plunger 116a of the limit switch closing the switch. When the cam follower is not engaged in a detent 44 the arm 112 is spaced from the rail 42 a sufficient distance to release the plunger 116a and open the limit switch contacts.

Figure 6:
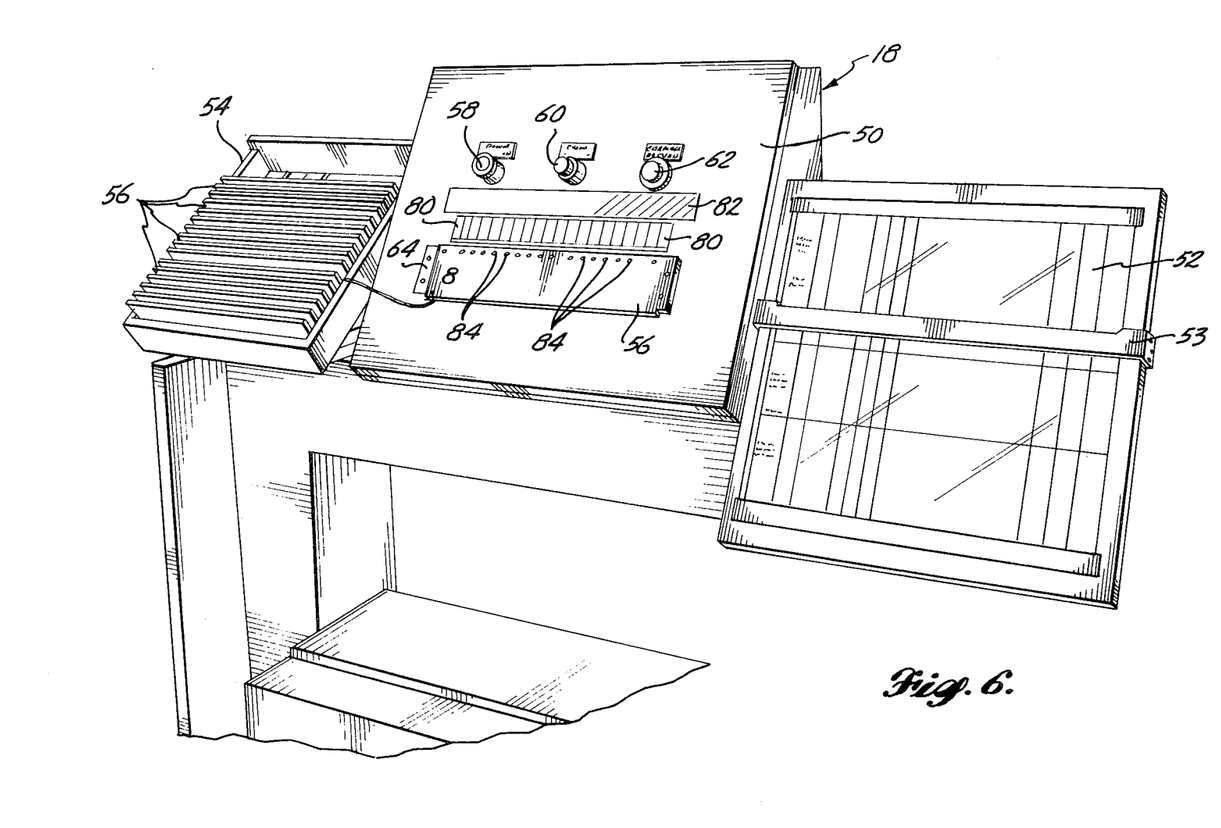
FIG. 6 is an isometric view of the main control station portion of the drilling machine of FIG. 1.

With reference to FIG. 6, the control station 18 includes a control and input portion 50 flanked by a drilling chart 52 on the one side and a drill sequence card holder 54 on the other. The drill sequence card holder 54 has removably mounted therein a series of programmed drill sequence cards 56 which contain encoded information relating to sets of stringer drilling patterns. The drill chart 52 lists all possible stringer drilling patterns and associated stringer part numbers so that the operator can determine which of the drilling sequence cards 56 is to be used to achieve the correct drilling pattern for the particular stringer to be drilled. The control and input portion includes the main control switches for the drilling machine, such as the main power switch 58 and the cycle start switch 60. A carriage return switch 62 is also included which is activated at the end of any given drilling cycle to return the detent slides 46 to their nonaligned position and permit free movement of the drill carriage 20 along the entire length of the tool base 10. The carriage control panel 121 of the drill carriage also includes a cycle start switch 60' and a carriage return switch 62' thereby allowing those functions to be initiated either at the control station 18 or the drill carriage 20. The drill carriage control panel 121 also includes a lamp 118 that lights when switch 116 closes indicating that the cam follower has engaged a detent. Once the lamp 118 lights, the drill cycle can be initiated by depressing the drill cycle switch 120 on the carriage control panel 121.

Figures 7, 8, 9:
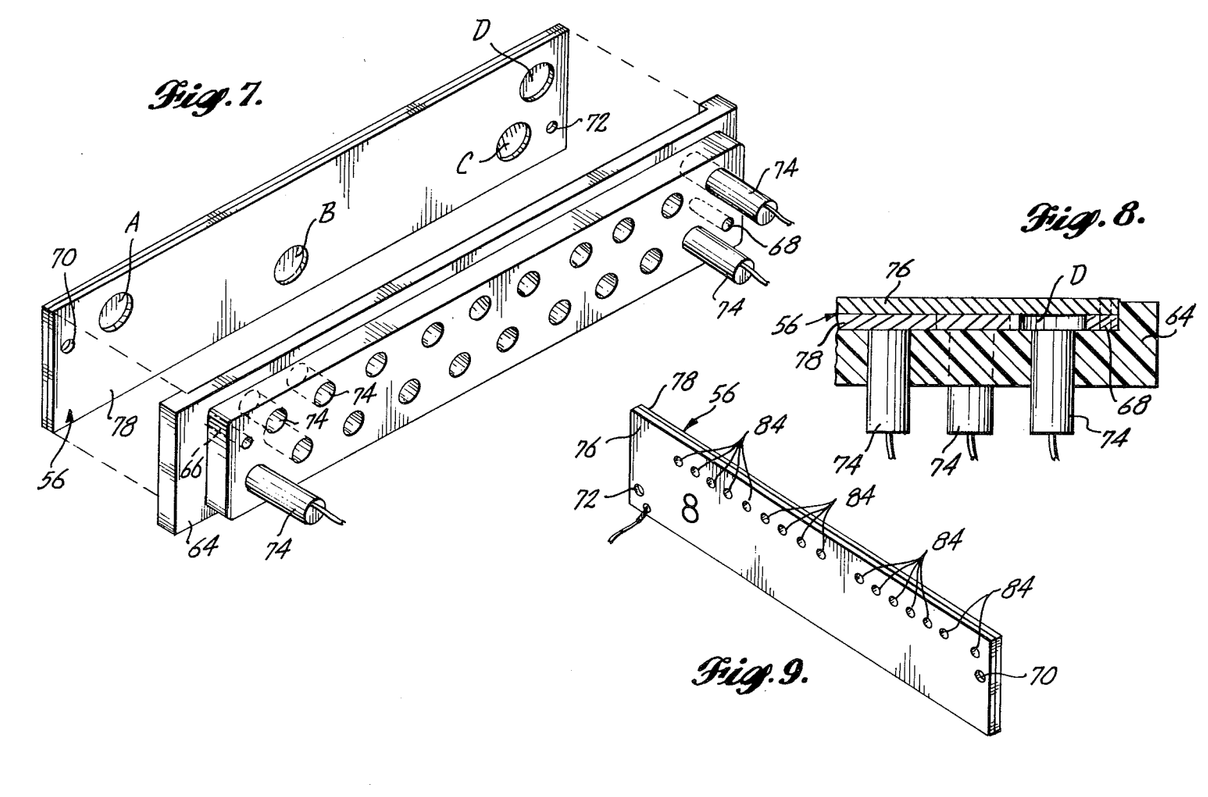
FIG. 7 is an isometric view of an information sensing panel made in accordance with the principles of the present invention in conjunction with the programmable card means of the present invention.
FIG. 8 is a plan view of a portion of the sensor panel of FIG. 5 with a drilling sequence card in place.
FIG. 9 is an isometric view of a typical drilling sequence card made in accordance with the principles of the present invention.

The control and input portion 50 includes a drill sequence card-mounting station 64 having a pair of alignment pins 66 and 68 affixed thereto which register with alignment holes 70 and 72 formed in the drill sequence cards 56 to ensure proper positioning of the drill sequence card 56 on the control panel 50. The drill sequence card-mounting station 64 is best viewed in FIG. 7. In the area covered by the drill sequence card 56 are a series of magnetic sensor switches 74 which are in the normally open state and which close upon the sensing of a ferrous material. The drill sequence cards 56 in turn are formed of a laminate of a first plate 76 composed of aluminum or some other non-ferrous material and a second plate 78 composed of steel or some other ferrous material. On a given drill sequence card, certain locations in the ferrous plate are drilled out corresponding to the location in the control panel of the magnetic sensing switch which controls the detent slide for the drilling location to be skipped in the drilling sequence. For example, in FIGS. 7, 8 and 9 a typical drill sequence card, arbitrarily designated card number 8, is pictured. The portions of the ferrous plate 78 in locations A, B, C and D have been removed. When the drill sequence card is placed on the control and input panel the ferrous plate on the drill sequence card causes all of the magnetic sensor switches 74 to close except for those located in juxtaposition to the drilled out locations, A, B, C and D on the drill sequence card. Closing of the magnetic sensor switches 74 activates a series of associated conventional pneumatic valves which permits air to flow to each of the linear actuators 47 that in turn move their associated detent slides 46 from the nonaligned to the aligned position. A status indicator assembly includes a series of indicator lamps 80 which are electrically coupled to limit switches 122 associated with each of the detent slides 46. When the detent slide 46 is in the nonaligned position the limit switch 122 associated therewith is open and the indicator light associated with that drilling station is off. When the detent slide 46 moves to its aligned position it closes the limit switch associated with that drilling station thereby lighting the indicator light associated with the drilling station to give the operator a visual indication of the status of the detent slide 46 at that drilling station.

The limit switch 122 includes a cam follower 104 mounted on an arm 106, the cam riding on an outer edge 124 of the detent slide 46 as it moves from the nonaligned to the aligned position. The arm 106 is connected to the switch assembly through a spring-biased, over-center linkage which holds the switch open until the detent slide substantially completes its travel path so that the slide is positively aligned with the detent. Only at that time does the over-center linkage allow the cam arm 106 to flip over to its closed position closing the switch and lighting the status light 80 at the status panel, indicating that the detent slide 46 is in position to accept the cam follower assembly. Similarly, when the stringer is completely drilled and all of the detent slides 46 returned to their closed position, a second cam follower 126 rides back on an inside edge of the detent slide 46 as it moves to its nonaligned position. The second cam follower 126 is mounted on a second arm 128 biased against the inside edge 125 of the detent slide assembly. The over-center linkage will not permit the second arm 128 to move to its open position until the detent slide is substantially at the full extent of its travel to the nonaligned position so that the indicator light indicating the status of the detent slide is not extinguished until the slide is completely out of alignment with the detent. The over-center linkage and spring biasing of the limit switch ensure a positive status indication and eliminate the possibility that the status light will indicate either an open or closed position when in actuality the detent slide is midway between the aligned and nonaligned positions.

An identification plate 82 is located above the status lamps 80 to identify which status light is associated with which drilling station. Each drill sequence card 56 contains a series of dots 84 along an edge portion adjacent the status indicator lamps 80. The pattern of dots on each drill sequence card 56 is directly related to the drilling pattern programmed on that drilling sequence card and provides the operator with a visual indication of the particular drilling pattern programmed on the drill sequence card. By visually comparing the pattern of dots 84 marked on the drill sequence card 56 with the pattern of lighted indicator lamps in the status indicator assembly 80, the operator can verify that each of the detent slides 46 is in the correct position to permit drilling of the desired hole pattern in the stringer 16 prior to starting the drilling operation without having to walk down the length of the tool base checking each detent slide individually.

Once the drill sequence card 56 is in place and the selected detent slides 46 have been operated to their aligned position the operator then manually moves the drill carriage 20 along the rods 22 and 23 until the cam follower 45 in the carriage engages a detent 44 thereby indexing the drill carriage at a desired drilling location. Engagement of the cam follower 45 in the drill carriage with the detent 44 in the rail 42 provides a coarse positioning index for the drilling location. Since the location of the holes in the stringer 16 is critical during final assembly of the aircraft, a finer position indexing must be accomplished. Each of the drill blocks 14 includes an aperture having a locating bushing 86 mounted therein. Once the drill carriage is coarsely positioned at a drilling station the operator activates the drilling cycle. Prior to actuation of the drill motors 32 and 34, a fine alignment pin 87 located in the drill carriage 20 engages the locating bushing 86 in the drill block 14 to provide a fine position indexing of the drill carriage 20 for proper stringer hole location. The fine alignment pin 87 is moved by a linear actuator 130. A limit switch 132 is closed by a wiper 134 when the alignment pin 87 is in place within the locating bushing 86. Closing of the limit switch 132 is a signal that the drill cycle can continue. As the locating bushings 86 experience wear, thereby affecting their positioning accuracy, the worn bushings can be replaced to reinstitute the location accuracy required.

Figure 10:
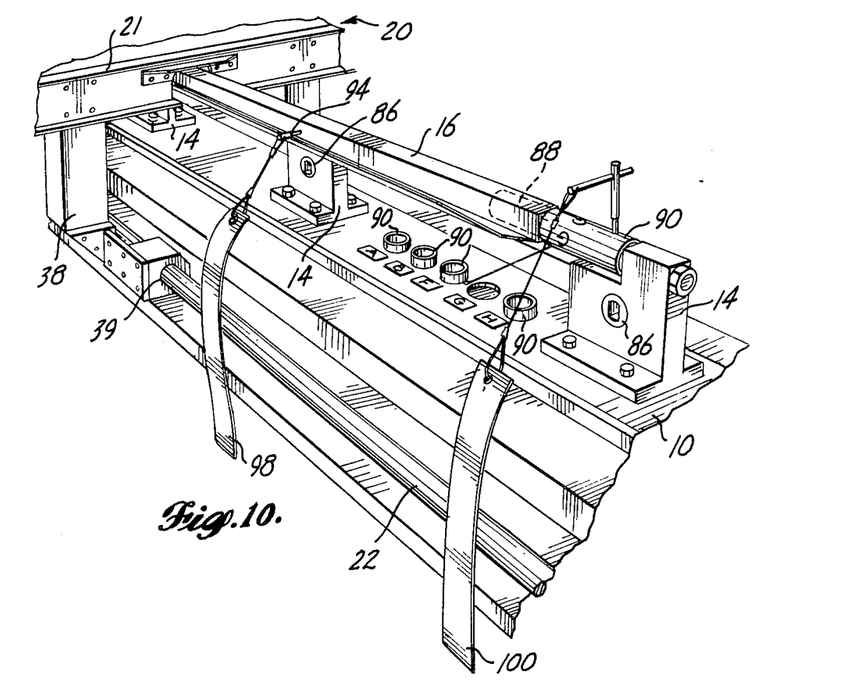
FIG. 10 is an isometric view of one end of the drilling machine of FIG. 1 particularly showing the workpiece locator made in accordance with the principles of the present invention.
Figure 11:
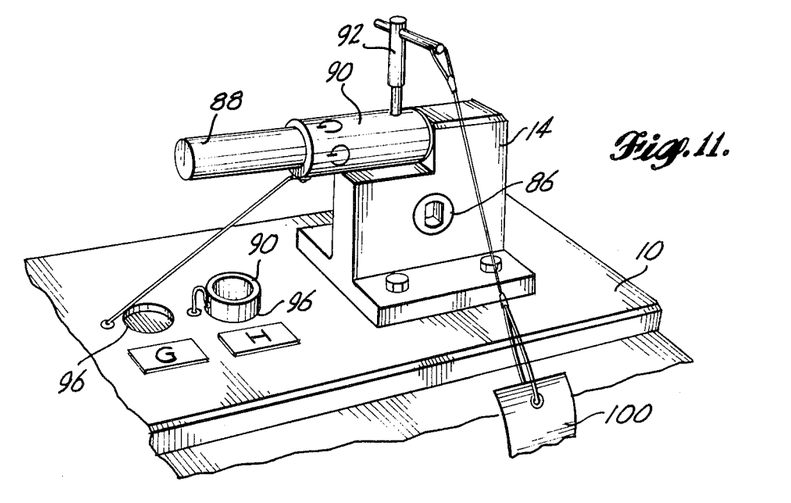
FIG. 11 is an isometric view in expanded scale of the workpiece locator shown in FIG. 10.

The number of possible stringer drilling patterns that can be produced by the drilling machine is enhanced through an indexing means for the stringer itself as it is located on the drill blocks 14. As best seen in FIGS. 10 and 11, the drill block adjacent a first end of the tool base 10 has a notch cut out of its upper corner and a cylindrical mandrel 88 is mounted thereon parallel to the stringer. A series of indexing tools 90 is provided consisting of cylindrical tubes of varying length, slidable over the cylindrical mandrel. The mandrel 88 and the indexing tools 90 are sized so that the mandrel extends past even the longest of the indexing tools and the stringer 16 is placed so that a first end of the stringer overlies the exposed portion of the mandrel 88. The first end of the stringer 16 is then butted against the indexing tool 90 to provide a longitudinal indexing of the stringer 16 relative to the tool base. Since the indexing tools 90 are of varying lengths the longitudinal positioning of the stringer 16, with respect to the tool base, is determined by the length of the indexing tool 90. The indexing tool 90 is held in place by a pin 92 which passes through a hole in the indexing tool 90 and a hole in the mandrel 88 so that the indexing tool 90 cannot slide during the drilling operation.

Prior to starting the drilling operation, the operator makes sure that the stringer 16 is firmly butted against the end of the indexing tool and then the first set of holes is drilled at the first drilling location. Once the first set of holes is drilled and the drill carriage 20 is moved away from that station to the next drilling station, a pin 94 can be placed through one of the holes in the stringer 16 and passed through a locating hole formed in the drill block 14 to hold the stringer 16 in place longitudinally with respect to the tool base and indexing tool 90. Pinning of the stringer 16 is necessary since the stringer is not otherwise clamped to the tool base and the drill carriage can exert some drag against the stringer as it is moved along the length of the stringer to the various drilling stations.

To further increase the versatility of the machine and increase the number of hole patterns that can be drilled, a second mandrel 88' is mounted on the drill block adjacent the other end of the tool base. It is therefore possible to index the stringer at either end, and indexing tools of varying length are provided at either end of the tool base. The correct indexing tool to be used and the end of the stringer at which the indexing is to occur are indicated on the drill chart 52 at the main control station 18 referenced to the part number of the particular stringer to be drilled. To facilitate use of the indexing tools 90 a series of indexing tool mounting holes 96 is formed in the tool base adjacent the indexing drill block for storage of the various indexing tools 90. Also, each of the indexing tools is identified with a letter or some other indication for ease in identification and selection by the operator. The pins 92 and 94 can have flags 98 and 100 attached thereto to make it easier for the operator to notice that the pins are in place so that he does not accidentally move the drill carriage across the pins. Also, the indexing tools 90 can be tethered to the tool base to prevent their loss.

Figure 12:
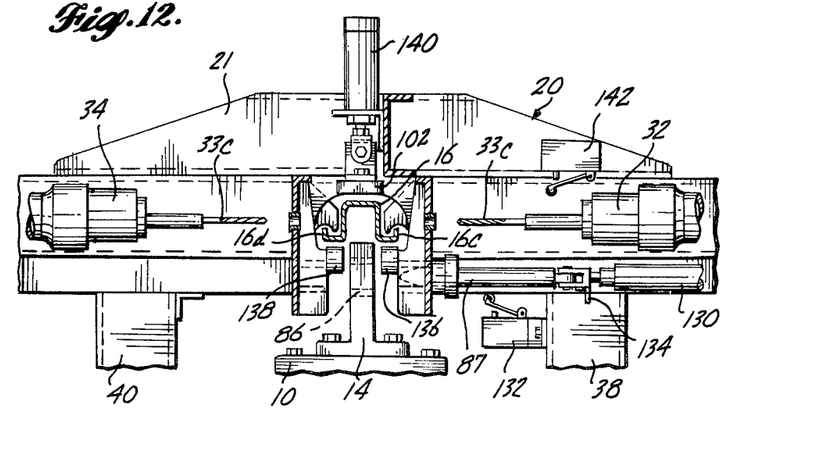
FIG. 12 is a side view in partial cross section of a portion of the drilling machine pictured in FIG. 3 with the drill carriage configured for travel.
Figure 13:
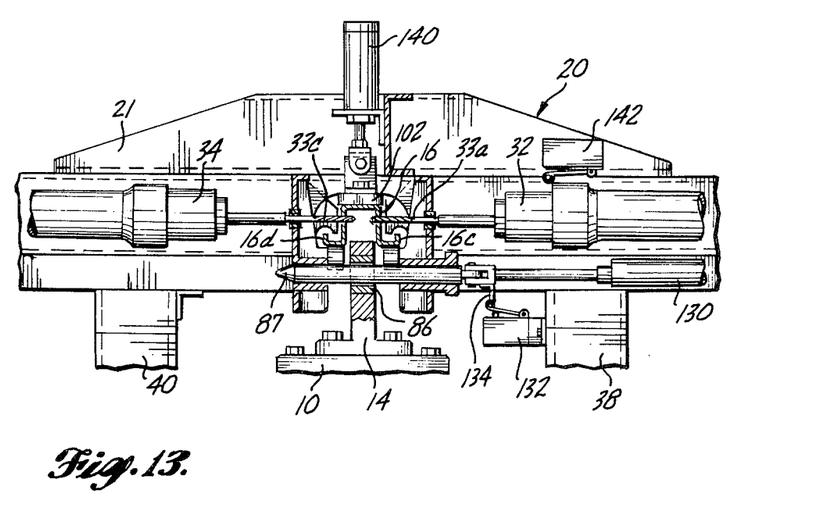
FIG. 13 is a side view in partial cross section of the drilling machine pictured in FIG. 12 with the drill carriage configured for drilling.

As seen in FIGS. 12 and 13 the stringer is typically of a hat-shaped cross section and the drill blocks 14 are sized so that the stringer 16 can be placed open end down and overlie the drill block 14 on either side. The stringer 16 is not clamped to the drill blocks but merely placed over them. While the stringers are in storage and during their fabrication they can become bent and warped to some degree, and the placement of the stringer on the drill blocks removes, at least coarsely, much of the warp in any given stringer. However, in order to ensure proper positioning of the holes drilled in the stringer, regardless of warp or bend in the stringer, indexing of the stringer for vertical hole location is not done with reference to the tool base or drill blocks but rather with regard to the drill carriage itself. As the drill carriage moves along the stringer, the stringer substantially floats in an opening formed in the drill carriage frame 21 with the lower flanges 16c and 16d of the stringer riding freely over sets of wheels 136 and 138 rotatably mounted on the carriage frame on opposite sides of the stringer. A clamping plunger 102 is mounted in the drill carriage above the stringer, and after insertion of the fine alignment pin 87 in the locating bushing 86 of the drill block 14 at the selected drilling location has closed limit switch 132, and prior to actuation of the drill motors 32 and 34, the clamping plunger 102 is activated by a pneumatic linear actuator 140 to press downwardly on the top of the stringer forcing the flanges 16c and 16d of the stringer against the uppermost outer surface of the wheels 136 and 138. The stringer is then held vertically rigid between the clamping plunger 102 and the wheels 136 and 138. A limit switch (not shown) closes when the clamping plunger 102 reaches its clamping position to signal that the drill cycle can continue. The drill motors 32 and 34 are then activated to drill the holes in the stringer sides while the stringer is firmly clamped. A limit switch 142 closes when the drill motor 32 has traveled far enough to complete hole drilling. The drill motors then retract from the stringer and clamping plunger 102 is released and fine-positioning pin 87 retracts allowing the drill carriage to be moved to the next drilling location. In this way the indexing of the stringer for proper vertical hole placement is done with respect to the drill carriage only and the stringer is never forced completely down on the drill block 14.

Figure 14:
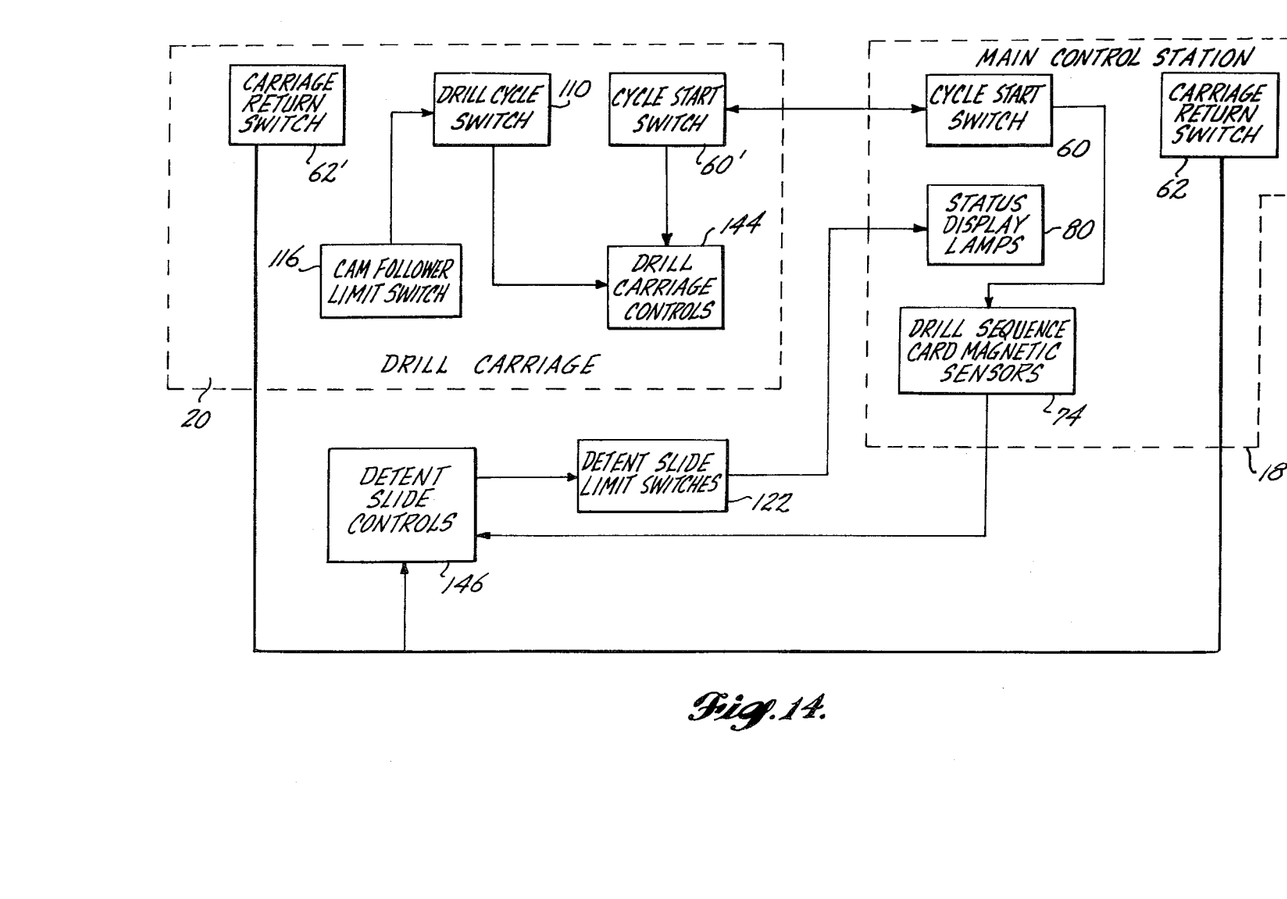
FIG. 14 is a data flow block diagram of the control circuitry for the structural component drilling machine of FIG. 1.

FIG. 14 is a block diagram showing the basic flow of data in the drilling machine described above. The main control station 18 includes the cycle start switch 60 and the carriage return switch 62. The functions of these switches can also be carried out by the cycle start switch 60' and the carriage return switch 62' located on the drill carriage 20. The main control station 18 also includes the status display lamps 80 and the drill sequence card magnetic sensors 74. The drill carriage 20 includes the drill cycle start switch 110 and the cam follower limit switch 116. The remaining drill carriage limit switches and electrically operated valves are designated as drill carriage controls 144. The control valves for the operation of the detent slides are generally indicated as detent slide controls 146 and are mechanically linked to the detent slide limit switches 122.

Depression of the cycle start switch 60 or 60' enables the magnetic sensors 74 to send the required signals to the detent slide controls 146 to move the selected detent slides 46 to the aligned position. When the detent slides are in the aligned position they close the limit switches 122 which in turn light the status display lamps 80 to permit the operator to visually verify that all desired drilling locations have been selected. As the operator moves the drill carriage along the tool base the cam follower 45 drops into the selected detents 44 in the rail 42 closing the cam follower limit switch 116. The closing of the cam follower limit switch 116 enables the drill cycle start switch 110. Depression of the drill cycle start switch 110 initiates the drill carriage controls 144 to perform a drill cycle at the selected location on the stringer. After the drilling cycle is completed the drill cycle switch 110 is released and the drill carriage controls are disabled. The operator then is able to move the drill carriage to the next drilling station to repeat the drilling cycle. When all the desired locations have been drilled the operator depresses the carriage return switch 62 on the main control panel 18 or the carriage return switch 62 on the drill carriage. The detent slide controls 146 then move all detent slides to the nonaligned position permitting free movement of the drill carriage along the entire length of the rail 42.

Although the operation of the drilling machine has been described in bits and pieces during the foregoing description of the structural components a complete drilling operation will now be described from start to finish. The operator selects a stringer from the stock pile of stringers provided and places the stringer on the tool base 10 overlying the drill blocks 14. The end of the stringer bears a part number which the operator reads and then consults the drill chart 52 to determine the operational setup to be used to drill that particular stringer. The operator moves a cursor 53 on the drill chart into alignment with the proper part number. He then reads from the drill chart the correct drill sequence card to be placed on the drill sequence card mounting station 64 which end of the stringer is to be indexed with the indexing tool 90, and the correct indexing tool 90 to be used. In the event more than one drill carriage is available, the drill chart will also have an indication as to which drill carriage is to be utilized. Once the setup parameters are determined, the operator then selects the proper drill sequence card 56 from the drill sequence card holder 54 and places it on the control panel. The operator then energizes the main power switch 58 which provides the necessary electric and fluid power inputs to the drilling machine. At this time all of the detent slides 46 will be in their nonaligned positions.

The operator then places the selected indexing tool 90 on the indexing mandrel 88 at whichever end of the stringer was indicated on the drilling chart. The indexing tool 90 is locked in place on the mandrel 88 with its pin 92 and the stringer butted against the indexing tool 90.

Once the stringer has been indexed and the drill sequence card 56 placed on the sensor panel, the operator depresses the cycle start switch 60 or 60' which activates the magnetic sensor switches 74 to operate the desired detent slides 46. As the detent slides 46 move to their aligned position, the status lamps 80 associated with those detent slides will light on the control panel. The operator then makes a visual check that the reference dots 84 on the installed drill sequence card match the lighted status lamps 80 on the status display assembly. If any mismatch is found, the operator must correct the fault either by manually freeing the detent slide if it is stuck for some reason, or otherwise determining why the status indicator lamp does not light. If there is a match between the status lamps and the dots 84 on the drill sequence card, the operator is ready to begin the drilling sequence.

The operator manually moves the drill carriage 20 along the stringer 16 to the first station to be drilled. The station is detected by the carriage when the cam follower on the carriage engages the first open detent 44 on the rail 42. An indicator lamp 108 on the carriage control panel illuminates whenever the cam follower 45 engages a detent. The operator is also able to feel a resistance generated by the cam follower when moving across an open detent. Once the drill carriage is positioned at the first station to be drilled, the operator depresses the drill cycle switch 120 on the carriage console and initiates the remaining carriage functions. The fine alignment pin 87 is automatically inserted into the locating bushing 86 in the drill block 14 to ensure proper fine alignment of the drill carriage with the stringer. The clamping plunger 102 is activated to press the stringer down against the wheels in the carriage frame holding the stringer in place for drilling. The drill motors are then activated and the drill bits are brought into contact with the stringer and the hole pattern drilled in the stringer walls. Once the holes are drilled limit switch 142 signals the completion of the drilling cycle and retracts the drills from the stringer. After the drills have been retracted, the plunger clamp 102 is released and the fine alignment pin 87 retracted from the locating bushing. The drill carriage is then free to be moved to the next desired drilling station.

To ensure that the stringer remains properly indexed during the entire drilling sequence, the hand-inserted retaining pin system is used. The drill blocks 14 associated with the first drill station at either end of the stringer 16 are equipped with bushings to accept retaining pins 94 which pass through the holes drilled in the stringer. After drilling the first set of holes, the drill carriage 20 is moved to allow access to the holes for insertion of the retaining pin 94 through the stringer and drill block bushing. Once the pin 94 has been inserted, the stringer will remain properly indexed as the carriage traverses the length of the stringer regardless of any friction between the carriage and the stringer tending to drag the stringer along with the carriage.

After all the stations with the detent slides 46 programmed in the aligned position have been drilled, the operator depresses the carriage return button 62' on the carriage control panel 121 or carriage return button 62 on the main control station 18. Operation of the carriage return button causes all detent slides to return to the nonaligned position, thereby allowing the carriage to be moved freely along the entire length of the tool base 10 without engaging any of the detents. The carriage can then be stored at either end of the tool base. The drilled stringer can be removed and the next stringer installed to begin the drilling operation again.

While the illustrated and described embodiment of the stringer-drilling machine of the present invention contains a drill carriage which is manually movable by the operator, it is envisioned that through the use of conventional servomechanical systems the drill carriage could be adapted for automatic movement along the length of the tool base without operator intervention so as to completely automate the stringer-drilling process. Such automated implementation would include feedback systems to monitor the position of the carriage and indicate to a master control circuit when the carriage was located within a selected detent. When such indication was received, the master controller could then automatically initiate the drilling cycle. Upon a signal from the drill carriage that the drill cycle has been completed the servomechanical system could then be automatically initiated to move the carriage until its feedback system indicated that the carriage was aligned with the next sequential selected detent at which time the drilling cycle could again be initiated by the master control circuit.

The actual drill motors used in the machine described herein are of conventional design and a suitable drill motor has been found to be the pneumatic feed drill manufactured and sold by Chicago Pneumatics of Utica, N.Y. under their designation CP-420 Model A. The magnetic sensor switches are standard ferrous sensor switches of the type distributed by Hamlin, Inc. under their Part No. 5401.

While a preferred embodiment of a drilling machine for drilling stringers and having preprogrammed indexing of the hole locations has been described and illustrated, it will be clear to those of ordinary skill in the art and others that several modifications can be made to the illustrated embodiment while remaining within the scope of the present invention. For example, one or more drill carriages can be utilized depending on the number of hole patterns typically drilled in a given item. Also, while four drills in opposing pairs are mounted in the drill carriage of the illustrated embodiment, the number of drills and their exact positioning will be determined by the environment in which the drilling machine is used and are not a part of the present invention. Further, it will be noted that while the invention has been described in the embodiment of a machine for drilling stringers for use in aircraft construction, the principles of the invention are equally applicable to any situation in which an elongated structural member is to be drilled in a predetermined pattern whether the member is to be utilized in aircraft construction or in some other type of construction. The limits of the present invention should therefore be defined only with reference to the appended claims.

The embodiments of the invention is which an exclusive property or privilege is claimed are defined as follows:

1. An indexing and control system for a drill carriage used to drill holes in a workpiece, said drill carriage being slidably mounted on an elongate rail, said indexing and control system comprising:

a plurality of detents formed at preselected locations along said rail;

a cam follower means associated with said drill carriage for cooperatively engaging said detents to coarsely position said carriage at the location of said detent;

index-cancelling means associated with each of said detents and operable to prevent said cam follower means from engaging said detents;

control means for selectively operating said index-cancelling means;

program means having information encoded thereon cooperably associated with said control means for directing said control means as to which index-cancelling means are to be selectively operated;

visually perceptible code means formed on said program means providing a visually perceptible read-out of the information encoded on said program means;

read-out means for displaying a visual indication of the status of said index-cancelling means to provide a visually perceptible comparison between the status of said index-cancelling means and the information encoded on said program means;

fine positioning means associated with said drill carriage and operable upon engagement of said cam follower means with said detent to lock said drill carriage into the desired position, said fine positioning means including a drill block mounted on said rail at each of said predetermined drilling locations, each said drill block having an aperture formed therein, a locating bushing mounted in said aperture in said drill block, a fine positioning pin means associated with said drill carriage and operable to engage said locating bushing, limit switch means associated with said cam follower means, said limit switch providing an enabling signal to said fine positioning pin means upon engagement of said cam follower means with said detent.

2. The system of claim 1 wherein said program means comprises:

a card formed of ferrous and nonferrous materials, said information being programmed on said card by the relative position of said ferrous and nonferrous material;

said control means including a sensing means for sensing the relative location of the ferrous and nonferrous material of said program means.

3. The system of claim 2 wherein said card is comprised of a laminate of a ferrous plate and a nonferrous plate, portions of the ferrous plate being removed at preselected locations to encode information on the card, and said sensing means including a plurality of magnetically sensitive switches positioned in a predetermined array in said control means, said magnetically sensitive switches producing a first signal when in proximity to a ferrous material.

4. The system of claim 1 further including a first workpiece indexing means adjacent a first end of said rail for positioning said workpiece in a selected one of a plurality of predetermined discrete positions relative to said rail.

5. The system of claim 4 further including a second workpiece indexing means adjacent a second end of said rail for positioning said workpiece in a selected one of a plurality of predetermined discrete positions relative to said rail, said first and second workpiece indexing means being operable alternatively to and mutually exclusively of one another.

6. A device for drilling holes in an elongate workpiece at predetermined drilling locations along said workpiece, said device comprising:
- a tool base;
- a plurality of drill blocks mounted on said tool base at said drilling locations;
- a rail means associated with said tool base and of a length at least that of said workpiece;
- a drill carriage slidably mounted for movement along said rail means;
- a plurality of indexing detents formed in said rail means in coincidence with said drill blocks;
- a workpiece index means mounted on said tool base adjacent a first end thereof;
- detent-engaging means associated with said drill carriage for engaging said indexing detents;
- a plurality of detent slide members slidably mounted on said rail assembly, each one adjacent one of said indexing detents and movable between a nonaligned position in which said slide prevents said detent-engaging means from engaging said detent and an aligned position in which said slide permits said detent-engaging means to engage said detent;
- slide control means for selectively moving said detent slide members between said nonaligned and aligned positions;
- program means having information encoded thereon and cooperably associated with said control means for directing said control means as to which detent slides are to be moved to said aligned position;
- visually perceptible check means formed on said program means corresponding to said encoded information;
- readout means associated with said detent slide for providing a visually perceptible status display showing which detent slides are in the aligned position.

7. The device of claim 6 wherein each of said drill blocks includes an aperture formed therein and further includes a locating bushing mounted within said aperture;
- a locating pin selectively engageable with said locating bushing to lock said drill carriage in the drilling location associated with said drill block.

8. The device of claim 7 further including a workpiece clamping means associated with said drill carriage for clamping said workpiece with respect to said drill carriage.

9. The device of claim 8 wherein said workpiece clamping means includes a clamping plunger associated with said drill carriage mounted above said workpiece and operable to apply downwardly directed force on said workpiece;
- workpiece support means associated with said drill carriage underlying said workpiece and supporting said workpiece under pressure of said plunger clamp.

10. The device of claim 6 further including a second workpiece index means mounted on said tool base adjacent a second end of said tool base thereby permitting indexing of said workpiece at either a first or a second end.

11. The device of claim 10 wherein said first and second workpiece index means include a mandrel upon which one end of said workpiece rests and further including a spacer member of predetermined length slidably and removably mounted on said mandrel to provide an indexing for the supported end of said workpiece.

12. The device of claim 11 further including a plurality of indexing spacers of various predetermined lengths each selectively mountable on said mandrels to provide various predetermined positions of said supported end of said workpiece relative to said tool base.

* * * * *

UNITED STATES PATENT AND TRADEMARK OFFICE
CERTIFICATE OF CORRECTION

PATENT NO. : 4,486,128

DATED : December 4, 1984

INVENTOR(S) : Irwin G. Baker et al.

It is certified that error appears in the above-identified patent and that said Letters Patent is hereby corrected as shown below:

On the title page;
Abstract, line 1: "includesto" should be --includes a stationary base having workpiece support posts located at positions corresponding to desired hole locations. A drill carriage having drill motors mounted thereon is movably mounted on a rail assembly coextensive with the workpiece enabling it to--

Column 11, line 62: "is" should be --in--

Signed and Sealed this

Twenty-fifth Day of June 1985

[SEAL]

Attest:

DONALD J. QUIGG

Attesting Officer    Acting Commissioner of Patents and Trademarks